United States Patent [19]
Freeman

[11] 3,955,610
[45] May 11, 1976

[54] SELF-SEATING TIRE TRACTION APPARATUS FOR CLAMPINGLY ENGAGING TIRE SIDEWALLS

[76] Inventor: Marshall E. Freeman, 1305 Camino Pablo, San Jose, Calif. 95125

[22] Filed: Apr. 28, 1975

[21] Appl. No.: 572,078

[52] U.S. Cl. .............................. 152/213 A; 152/223; 152/239
[51] Int. Cl.² .................... B60C 27/06; B60C 27/14
[58] Field of Search ............ 152/208, 213 R, 213 A, 152/214, 216, 223, 239; 238/14

[56] References Cited
UNITED STATES PATENTS

| | | | |
|---|---|---|---|
| 1,308,153 | 7/1919 | Wheat | 152/213 R |
| 2,608,234 | 8/1952 | Hughes | 152/213 R |
| 2,865,422 | 12/1958 | Royer | 152/213 R |

Primary Examiner—Drayton E. Hoffman
Attorney, Agent, or Firm—Boone, Schatzel & Hamrick

[57] ABSTRACT

A tire traction apparatus for use on a tire comprising at least one chain having first and second ends and a length slightly greater than the circumference of the tire, a latch for securing the first end to a portion of the chain proximate the second end, and a plurality of generally U-shaped members affixed to the chain at spaced-apart intervals, the members including a tire tread engaging base portion and a pair of opposed tire sidewall engaging portions, the chain serving to provide improved traction on ice, the base portion serving to provide improved traction on snow, and the tire sidewall engaging portions serving to maintain the chain on the tread.

11 Claims, 2 Drawing Figures

SELF-SEATING TIRE TRACTION APPARATUS FOR CLAMPINGLY ENGAGING TIRE SIDEWALLS

BACKGROUND OF THE INVENTION

1. Field of the Invention

The present invention relates generally to traction improving device, and more particularly to tire traction apparatus which clampingly engages tire sidewalls in a self-seating manner.

2. Description of the Prior Art

Heretofore, tire chains have commonly been used when roadways have been too slippery to permit dependence upon the rubber tread of automobile tires for safe and satisfactory traction. Such tire chains typically include a plurality of cross-link road engaging sections stretched between parallel side lengths of tire circumscribing chain. The side lengths serve to hold the road engaging sections against the tire tread and must be stretched around both sidewalls of a tire. The problem associated with such chains is that they are difficult to install. For example, a person is required to reach under the fender behind the tire to fasten the ends of the inside chain into a closed loop. Typically, the person must lie on his back in the snow or slush to reach the inside chain. In addition, chain tighteners comprising a rubberband having a number of hooks depending therefrom must be installed on the outside length of chain to prevent the chain from banging against the fender. Hence, it should be realized that installation of the available chains is difficult and often messy.

In the prior art, several patents teach tire traction apparatus. In particular, U.S. Pat. No. 1,101,198, entitled "Tire Grip" by W. B. Lashar; U.S. Pat. No. 1,361,022, entitled "Non-Skid Appliance" by G. S. Cucchiara; U.S. Pat. No. 2,043,233, entitled "Track for the Wheels of Vehicles" by J. M. Colby; and U.S. Pat. No. 3,437,121, entitled "Emergency Tire Traction Device" by G. Strapko et al teach traction devices for installation on vehicle tires. However, none of the devices teach an apparatus which includes a member which clampingly engages the tire sidewalls or employs a self-seating concept.

SUMMARY OF THE PRESENT INVENTION

Accordingly, it is a primary object of the present invention to provide a tire traction apparatus which simplifies the task of putting the apparatus on a tire.

Another object of the present invention is to provide a tire traction apparatus which may be self-seated on the tire so that the person installing the chains does not have to lie on his back.

Still another object of the present invention is to provide a tire traction apparatus which provides improved traction on both snow and ice.

Briefly, the preferred embodiment comprises at least one chain having first and second ends and a length slightly greater than the circumference of the tire, a latch for securing the first and second ends together, and a plurality of generally U-shaped members affixed to the chain at spaced-apart intervals, the members including a tire tread engaging base portion and a pair of opposed tire sidewall engaging portions. The tire sidewall engaging portions of the members affixed closest to the first and second ends are formed from a resilient material and normally spaced-apart a distance less than that between the tire sidewalls so as to clampingly engage the tire sidewalls.

An advantage of the present invention is that it is simply installed on the tire of a vehicle by rolling the tire over the apparatus.

Another advantage of the present invention is that it includes a generally smooth road engaging surface which provides traction on both snow and ice.

The foregoing and other objects, features and advantages of the invention will be apparent from the following detailed description of the preferred embodiment illustrated in the several figures of the drawing.

IN THE DRAWING

FIG. 1 is a perspective view of a tire traction apparatus in accordance with the present invention which is partially installed on a tire, with portions of the tire being broken away for clarity; and FIG. 2 is a perspective view of a latching portion of the tire traction apparatus of FIG. 1.

DETAILED DESCRIPTION OF THE PREFERRED EMBODIMENT

Figure 1:
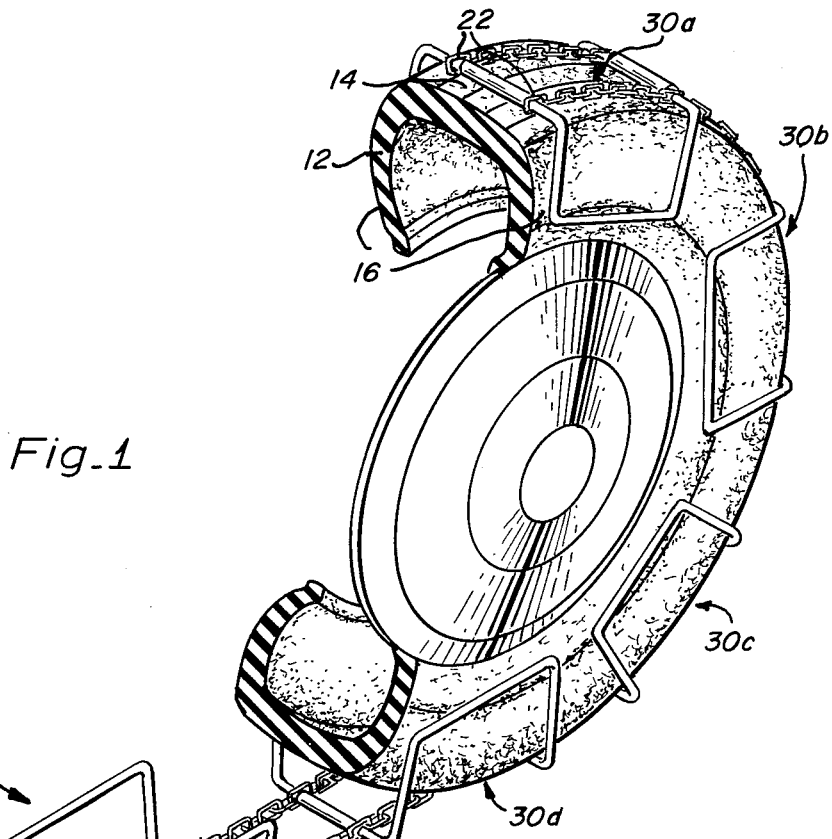

FIG. 1 illustrates in a perspective view a tire traction apparatus 10 in accordance with the present invention. The apparatus 10 is shown partially installed on a tire 12 having a tread 14 and a pair of opposed sidewalls 16. Portions of the tire are shown broken away for purposes of clarity.

The apparatus 10 includes two chains 20, each including corresponding ends 22 and 24 and having a length slightly greater than the tread circumference of the tire 12. The chains 20 are comprised of a series of generally elliptical interconnected loops 26 but may be formed in other road gripping configurations.

Six generally U-shaped members 30a–30f are affixed to the chains 20 at spaced-apart intervals. Each of the members 30 includes a tire tread engaging base portion formed by a pair of spaced-apart cleats 32 and a pair of opposed tire sidewall engaging portions 34 linked to the corresponding ends of the cleats 32. As illustrated, the cleats 32 are disposed parallel to each other and transverse to the chain 20. An elastomeric material, such as rubber, is formed over the central portion of the cleat 32. The portions of the cleat 32 adjacent the elastomeric material are affixed to the corresponding loops 26 of the chains 20 as by welding. The thickness of the elastomeric material should be substantially the same as the minor diameter of the loops 26 to provide a generally smooth road-engaging surface. Accordingly, when the apparatus 10 is installed on the tire 12, the road-engaging surface provided by the cleats 32 and the loops 26 is a substantially constant distance from the tire tread 12. Hence, it is believed that a generally cushioned effect will be produced as the tire rotates and the vehicle will not exhibit as bumpy a ride as that typically encountered when chains are placed on a tire.

The tire sidewall engaging portions 34 are generally U-shaped and include a pair of opposed legs 36 linked to the corresponding ends of the cleats 32 and a base 38 interconnecting the legs 36. The legs 36 have a length greater than one-half the height of the tire sidewall 16 to facilitate the tire gripping action. The U-shaped members 30 are formed from a rod of a resilient material which is bent to shape and welded into the unitary structure shown.

The U-shaped members 30a and 30f affixed closest to the ends 22 and 24, respectively, include tire sidewall engaging portions 34 which are normally spaced apart a distance less than the distance between the tire sidewalls 16. Because the members 30 are formed from a resilient material, the portions 34 are urged toward one another with a force dependent upon the characteristics of the material used. When forced apart, the members 30 serve to clampingly engage the tire sidewalls 16.

The tire sidewall engaging portions 34 of the intermediate U-shaped members 30b–30e are perpendicular to, or flared outwardly at a small angle from the ends of the corresponding cleats 32. Hence, the tire sidewall engaging portions 34 of these members are spaced apart a distance equal to or slightly greater than the distance between the tire sidewalls 16. The portions 34 slightly contact the sidewalls 16 and serve to restrain the chains 20 from lateral movement and to prevent the chains from leaving the tread 14. Alternatively, the members 30b–30e may be formed similarly to the members 30a and 30f.

Figure 2:
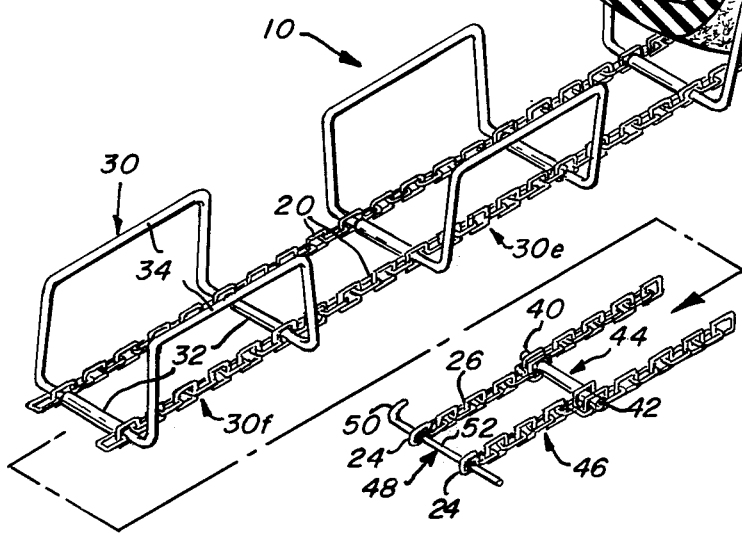
Figure 2:
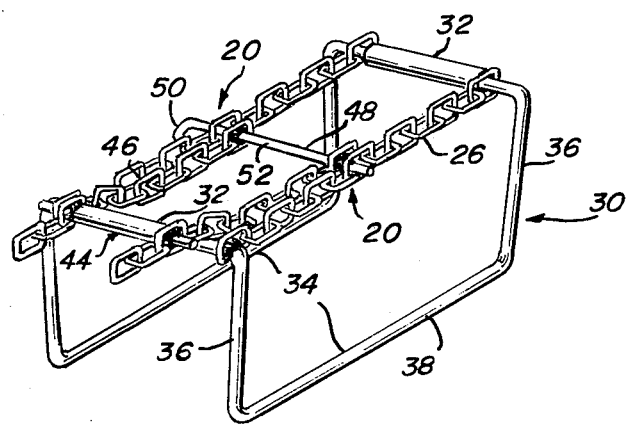

Referring also to FIG. 2, a rod 40 is affixed, as by welding, transverse to the chains 20 intermediate the member 30f and the end 24. An elastomeric material 42 is formed about the rod 40 so as to provide a cleat 44. The loops 26 at the weld are angled inwardly so that the transverse distance between the lengths of chain 46 between the rod 40 and the ends 24 is less than the transverse distance between the lengths of chains 20 proximate the end 22. Consequently, the length of chain 46 which overlaps the end 22 lies inside the chains 20 proximate that end.

A latch 48 is secured to the ends 24. The latch 48 is generally L-shaped and comprises a leg portion 50 and a pin portion 52. The leg portion 50 extends in the same direction as the length of chain 20 and is adapted to be inserted through a preselected loop 26 of the overlapped chain 20 in a latching arrangement. The pin portion 52 extends transverse to the length of chain 20 and is adapted to be inserted through a corresponding loop 26 of the opposed chain 20 in a latching arrangement such that the portions 50 and 52 serve to secure the ends of the chains together.

In operation, the chains 20 are stretched out on the road with the member 30a facing upwardly behind a rear tire 12 of a vehicle. As the vehicle is backed up, the rear tire 12 rolls over the cleats 32 of the member 30a, forcing the opposed tire sidewall engaging portions 34 apart. Because of the spring force biasing the portions 34 toward one another, the portions clampingly engage the tire sidewalls 16 and seat the member 30a on the tire 12. Continued rotation of the tire causes the seated member 30a to carry the intermediate members 30b–e around the tire with the cleats 32 engaging the tread 14. The outward flare of the tire sidewall engaging portions 34 of the intermediate members 30b–e enhances seating of the cleats 32 against the tread 14 and since the portions do not clamp the sidewalls, a smooth articulation of the individual loops 26 around the tread 14 is accomplished. After installation the members 30b–e prevent the chains 20 from laterally sliding off the tread 14.

As the last member 30f is encountered by the tire 12, the opposing tire sidewall-engaging portions 34 of that member are forced outwardly into clamping engagement with the sidewall 16. Once the members 30a and 30f are clamped to the sidewalls 16 the vehicle is stopped and the ends 22 and 24 latched together. More particularly, the leg portion 50 and the pin portion 52 are inserted into the corresponding loops 26 in the two chains 20. After latching, the apparatus 10 is firmly mounted on the tire 12.

It should be recognized that the apparatus improves tire traction on both ice and snow since the loops serve to prevent skidding on ice and the cleats allow traction on snow. Moreover, since the road-engaging surface formed by the cleats and the chain lies in a generally cylindrical plane, continuous traction is provided around the entire circumference of the tire. In addition, the substantially smooth road-engaging surface allows the tire to smoothly contact the road in a manner which minimizes the "bumpy ride feeling." It should also be noted that the apparatus requires a minimum of storage space since the U-shaped members may be nested within one another when not in use.

In the preferred embodiment, the chains have substantially the same length and the loops are formed from steel, although polypropelene or reinforced fiberglass may also be used. The member 30 is formed from a unitary steel rod which is bent into the illustrated configuration and secured together by butt welding. Also, the length of chain between the members is such that adjacent cleats are spaced apart substantially equidistances.

In an alternative embodiment, the apparatus is comprised of a single chain having male and female latch members at either end.

While the invention has been particularly shown and described with reference to a certain preferred embodiment, it will be understood by those skilled in the art that various alterations and modifications in form and detail may be made therein. Accordingly, it is intended that the following claims cover all such alterations and modifications as fall within the true spirit and scope of the invention.

What is claimed is:

1. A tire traction apparatus for use on a tire comprising:
   at least one chain having first and second ends and a length slightly greater than the circumference of the tire;
   means for securing said first end to a portion of said chain proximate said second end; and
   a plurality of spaced-apart generally U-shaped members each including a tire tread engaging base portion affixed to said chain such that said chain is adapted to engage the road-engaging surface of the tire tread and a pair of opposed tire sidewall engaging portions, said chain serving to provide improved traction on ice, said base portion serving to provide traction on snow and said tire sidewall engaging portions serving to maintain said chain on the tread.

2. A tire traction apparatus for use on a tire as recited in claim 1 wherein said members affixed closest to said first and second ends are formed from a resilient material and have tire sidewall engaging portions that are normally spaced apart a distance less than that between the tire sidewalls, said tire sidewall engaging portions of those members being spread apart when seated on a tire so as to clampingly engage the tire sidewalls.

3. A tire traction apparatus for use on a tire comprising:
   at least one chain having first and second ends and a length slightly greater than the circumference of the tire;
   means for securing said first end to a portion of said chain proximate said second end; and a plurality of generally U-shaped first members affixed to said chain at spaced-apart intervals, said first members including a pair of spaced-apart cleats disposed transverse to said chain and adapted to engage the tire tread and further including a pair of opposed second U-shaped members, each linking the corresponding ends of said pair of cleats and adapted to engage the respective tire sidewall, said first members affixed closest to said first and second ends being formed from a resilient material and having second U-shaped members that are normally spaced apart a distance less than that between the tire sidewalls, said second U-shaped members of those first members being spread apart when seated on a tire so as to clampingly engage the tire sidewalls, said chain serving to provide improved traction on ice, said cleats serving to provide traction on snow and said second U-shaped members serving to maintain said chain on the tread.

4. A tire traction apparatus for use on a tire as recited in claim 3 wherein said cleats are formed from an elastomeric material to provide traction in snowy conditions.

5. A tire traction apparatus for use on a tire as recited in claim 3 wherein said first U-shaped members are of unitary construction.

6. A tire traction apparatus for use on a tire as recited in claim 5 wherein said first U-shaped members are formed from a steel rod.

7. A tire traction apparatus for use on a tire as recited in claim 3 wherein said apparatus includes two parallel chains.

8. A tire traction apparatus for use on a tire as recited in claim 7 wherein each said cleat is welded to said chains proximate the ends of the cleats.

9. A tire traction apparatus for use on a tire as recited in claim 8 wherein said cleats are formed from an elastomeric material and wherein said chains and cleats form a road-engaging surface that is substantially cylindrical.

10. A tire traction apparatus for use on a tire as recited in claim 7 wherein said means for securing includes an L-shaped pin welded proximate its ends to said first end of said chain.

11. A tire traction apparatus for use on a tire as recited in claim 7 wherein said second U-shaped member extends inwardly a distance more than one-half the height of the tire sidewall.

* * * * *